(12) United States Patent
Birau et al.

(10) Patent No.: US 8,329,854 B2
(45) Date of Patent: Dec. 11, 2012

(54) SYNTHESIS OF TRI-COMPONENT RESINS

(75) Inventors: Maria Birau, Mississauga (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 89 days.

(21) Appl. No.: 12/891,656

(22) Filed: Sep. 27, 2010

(65) Prior Publication Data

US 2012/0077953 A1    Mar. 29, 2012

(51) Int. Cl.
| | |
|---|---|
| C08G 63/00 | (2006.01) |
| C08G 63/08 | (2006.01) |
| C08G 63/44 | (2006.01) |
| C08G 67/00 | (2006.01) |
| C08G 69/00 | (2006.01) |
| C08G 69/26 | (2006.01) |
| C08G 73/00 | (2006.01) |

(52) U.S. Cl. ......... 528/332; 528/271; 528/354; 528/363
(58) Field of Classification Search .................. 528/271, 528/332, 354, 363
See application file for complete search history.

(56) References Cited

U.S. PATENT DOCUMENTS

| | | | | |
|---|---|---|---|---|
| 6,174,937 | B1 | 1/2001 | Banning et al. | |
| 6,989,052 | B1 * | 1/2006 | Wu et al. | 106/31.29 |
| 2007/0203272 | A1 | 8/2007 | Heinrichs | |

FOREIGN PATENT DOCUMENTS

EP    1826235    8/2009

* cited by examiner

Primary Examiner — Patrick Niland
(74) Attorney, Agent, or Firm — Pillsbury Winthrop Shaw Pittman LLP (57) ABSTRACT

A resinous compound of the formulas

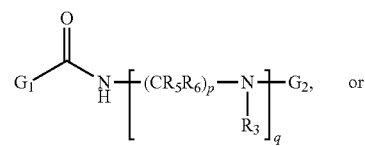

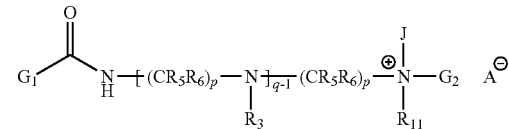

or a salt thereof, wherein $G_1$ is $-X_1C(O)OR_1$, $-X_2OC(O)R_2$, or $-X_2OH$; $G_2$ is $R_4$, $R_{12}$, $-C(O)R_2$, $-C(O)X_1C(O)OR_1$, or $-C(O)X_2OC(O)R_2$; $R_1$ is an alkyl having from 10 to 80 carbon atoms; $R_2$ is an alkyl having from 2 to 40 carbon atoms; each $R_3$ and $R_4$ is independently hydrogen, alkyl, arylalkyl or alkylaryl; each $R_5$ and each $R_6$ is independently hydrogen or alkyl; $X_1$ and $X_2$ are both a straight or branched alkylene group; t1 is 1 to 20; t2 and t3 is independently 0 to 20; u1 is 1 to 30; u2 and u3 is independently 0 to 30; each $R_7$ and each $R_8$ is independently hydrogen, alkyl, or alkoxyl; each $R_9$ and each $R_{10}$ is independently hydrogen, alkyl, or alkoxyl; Ar is a substituted or unsubstituted aromatic moiety; p is 1 to 5; q is 1 to 12; $A^{\ominus}$ is selected from the group consisting of $Cl^-$, $Br^-$, $I^-$, $HSO_4^-$, $HSO_3^-$, $CH_3SO_3^-$, $NO_3^-$, $HCOO^-$, $CH_3COO^-$, $H_2PO_4^-$, $SCN^-$, $BF_4^-$, $ClO_4^-$, $SSO_3^-$, $PF_6^-$, and $SbCl_6^-$; and J is alkyl, arylalkyl, or alkylaryl.

20 Claims, 4 Drawing Sheets

SYNTHESIS OF TRI-COMPONENT RESINS

CROSS REFERENCE TO RELATED APPLICATIONS

Reference is made to co-pending, U.S. Patent Application to Birau et al., U.S. patent application Ser. No. 12/891,619, published on Mar. 29, 2012 as U.S. Patent Publication 2012-0077913, filed concurrently herewith, entitled, "Tri-Component Resins for Pigmented Ink", the entire disclosure of which is incorporated herein by reference in its entirety.

BACKGROUND

The disclosure relates generally to inks, for example, solid inkjet inks. More specifically, the disclosure relates to pigment resinous compounds particularly compatible with or useful as compositions useful in stabilizing pigment particles in solid inks at high temperatures. In embodiments, the pigment resinous compounds comprise a long chain having at least 10 carbon atoms for stabilizing pigment particles in solid inks, and further comprise amines for adsorbing onto the pigment particle surface.

Pigments generally offer better colorfastness over dyes, and are characterized by low specific gravity and greater resistance to migration than dyes. In addition, pigment-based inks are more robust than dye-based inks, and are relatively much less expensive than dye colorants, especially custom dye colorants. However, many of the solid ink jet ink compositions contain dye colorants instead of pigment colorants, because it is difficult to overcome the challenges in developing pigment-based inks. The challenges include properly dispersing the pigment particles in the ink and being able to reliably jet the ink without clogging the printheads by the pigment particles.

Pigments are known to be hard to disperse in most media because they tend to aggregate in large structures. In addition, print-heads are typically operated at high temperatures, for example, from 115° C. to 120° C., which has a destabilizing influence on the pigment dispersion.

Many of the commercially available polymeric dispersants are designed for aqueous based or solvent based inks, and therefore, they are not compatible with the hydrophobic wax based solid inks. Further, these polymeric dispersants are in liquid or paste forms, thus they cannot withstand the excessive temperatures in the printer for long periods of time. Lastly, the use of polymers in solid ink is not favored because: a) polymers have a negative impact on rheological properties producing non-newtonian behavior which cause viscosity to increase, b) polymers tend to form filaments which affect drop formation of the ink during jetting (i.e. the formation of small drop sizes of the ink).

Thus, there exists a need for pigment stabilizing resinous compounds that are chemically stable, are compatible with the solid ink formulation, and are capable of effectively dispersing and stabilizing pigment particles in solid inks over long periods of time at high temperatures.

In order to solve the above-identified problems, this disclosure describes pigment stabilizing resinous compounds that are capable of providing steric stabilization of the pigment particles in solid ink, and being able to be adsorbed (or anchored) to the pigment particle surface.

Figure 1:
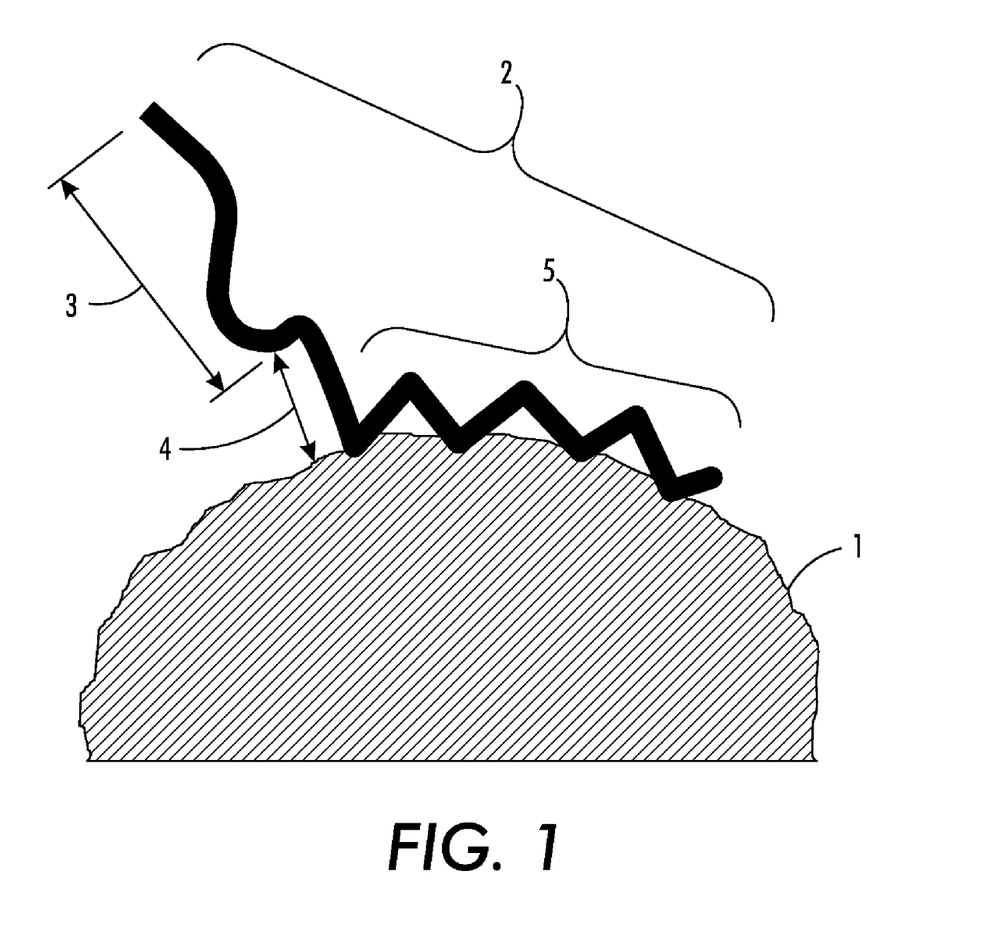
FIG. 1 illustrates a pigment stabilizing resinous compound being anchored onto a pigment particle.

FIG. 1 illustrates a pigment stabilizing resinous compound 2 being anchored onto a pigment particle 1. The pigment stabilizing resinous compound (or resinous compouns, or tri-component resins) 2 comprises a waxy chain that contains two components (i.e. a hydrocarbon or polymeric long chain at the tail end of the molecule, and a chain extensor at the middle part of the molecule) known as a brush or a stabilizing tail, for providing steric stabilization of the pigment particles in solid ink, or for being compatible with the non-polar wax based solid ink. Because longer stabilizing tails improve stabilization of pigments in solid ink, the chain extensor helps to increase the length of the waxy chain. For solid inks composed mainly of polyethylene wax, therefore in some embodiments, a suitable brush would be polyethylene wax based, and the like, although other materials can also be used for the brush. The pigment stabilizing resinous compound (or resinous compouns or tri-component resins) 2 further comprises functional groups 5, which includes but are not limited to various amines, that can strongly adsorb (or anchor) onto the pigment particles surface through hydrogen bonding to provide pigment stabilization, so that the pigments can withstand high temperatures (>100° C.) used in most solid ink printers. In some instances regarding pigment particle stabilization of inks and the like, it can be advantageous to have the pigment particles stabilized through adsorption of the stabilizing resinous compound 2 onto the pigment particle 1 such that the functional groups 5 of the stabilizing resinous compound 2 are anchored onto the pigment. The waxy chain 3 and/or 4 of the stabilizing resinous compound 2 are optimally selected for both its molecular weight and its miscibility with the ink carrier in such a way that the stabilizing resinous compound provides an effective steric barrier that hinders pigment particle flocculation.

SUMMARY

The present disclosure is directed to a compound of the formula

I or a salt thereof, wherein:
$G_1$ is —$X_1C(O)OR_1$, —$X_2OC(O)R_2$, or —$X_2OH$;
$G_2$ is $R_4$, —$C(O)R_2$, —$C(O)X_1C(O)OR_1$, or —$C(O)X_2OC(O)R_2$;
$R_1$ is an alkyl having from 10 to 80 carbon atoms;
$R_2$ is independently an alkyl having from 2 to 40 carbon atoms;
each $R_3$ and $R_4$ is independently hydrogen, alkyl, arylalkyl or alkylaryl, wherein the $R_3$ attached to the same nitrogen atom as $R_4$ and $R_4$ can be joined together to form a ring;
each $R_5$ and each $R_6$ is independently hydrogen or alkyl;
$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;
$X_2$ is a straight or branched alkylene group having the formula $(CR_9R_{10})_{u1}$ or a straight or branched aromatic alkylene group having the formula $(CR_9R_{10})_{u2}$—Ar—$(CR_9R_{10})_{u3}$;
t1 is an integer of from 1 to 20;
t2 and t3 is independently an integer of from 0 to 20;
u1 is an integer from 1 to 30;
u2 and u3 is independently an integer from 0 to 30;

each $R_7$ and each $R_8$ is independently hydrogen, alkyl, alkoxyl, or any two $R_8$ together on adjacent carbon atoms forming an alkene having the structure $(CR_7=CR_7)$;

each $R_9$ and each $R_{10}$ is independently hydrogen, alkyl, or alkoxyl;

Ar is a substituted or unsubstituted aromatic moiety;

p is an integer from 1 to 5; and q is an integer from 1 to 12.

In certain embodiments, $G_1$ is $-X_1C(O)OR_1$. In certain embodiments, $G_1$ is $-X_2OC(O)R_2$. In certain embodiments, $G_2$ is $-C(O)R_2$. In certain embodiments, $G_2$ is $-C(O)X_1C(O)OR_1$. In certain embodiments, $G_2$ is $-C(O)X_2OC(O)R_2$.

In certain embodiments, $R_1$ is an alkyl comprising from 30 to 50 carbon atoms. In certain embodiments, $R_2$ is an alkyl comprising from 4 to 20 carbon atoms. In certain embodiments, $X_1$ is an a straight or branched alkylene group having the formula $(CR_7R_8)_{t1}$. In certain embodiments, $X_2$ is a straight or branched alkylene group having the formula $(CR_9R_{10})_{u1}$. In one embodiment, $R_3$ is hydrogen. In one embodiment, $G_2$ is $R_4$. In one embodiment, $R_4$ is hydrogen. In one embodiment, $R_4$ is alkyl. In one embodiment, $R_4$ is methyl. In one embodiment, each $R_5$ and each $R_6$ are hydrogen. In certain embodiments, p is an integer from 2 to 3. In certain embodiments, q is an integer from 1 to 8.

In certain embodiments, the resinous compound have the formula or a salt thereof, wherein:

$R_1$ is an alkyl having from 10 to 80 carbon atoms;

each $R_3$ and $R_4$ is independently hydrogen, alkyl, arylalkyl or alkylaryl, wherein the $R_3$ attached to the same nitrogen atom as $R_4$ and $R_4$ can be joined together to form a ring;

each $R_5$ and each $R_6$ is independently hydrogen or alkyl;

$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;

t1 is an integer of from 1 to 20;

t2 and t3 is independently an integer of from 0 to 20;

each $R_7$ and each $R_8$ is independently hydrogen, alkyl, or alkoxyl;

Ar is a substituted or unsubstituted aromatic moiety;

p is an integer from 1 to 5; and q is an integer from 1 to 12.

In certain embodiments, the resinous compound have a melting point of from about 50° C. to about 150° C. In certain embodiments, the resinous compound have a molecular weight of from about 700 to about 1500 Daltons.

In certain embodiments, a resinous compound salt of the formula wherein:

$G_1$ is $-X_1C(O)OR_1$, $-X_2OC(O)R_2$, or $-X_2OH$;

$G_2$ is, $R_{12}$, $-C(O)R_2$, $-C(O)X_1C(O)OR_1$, or $-C(O)X_2OC(O)R_2$;

$R_1$ is an alkyl having from 10 to 80 carbon atoms;

$R_2$ is an alkyl having from 2 to 40 carbon atoms;

each $R_3$ is independently hydrogen, alkyl, arylalkyl or alkylaryl;

each $R_{11}$ and $R_{12}$ is independently alkyl, arylalkyl, alkylaryl, or $R_{11}$ and $R_{12}$ can be joined together to form a ring;

each $R_5$ and each $R_6$ is independently hydrogen or lower alkyl;

$X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;

$X_2$ is a straight or branched alkylene group having the formula $(CR_9R_{10})_{u1}$ or a straight or branched aromatic alkylene group having the formula $(CR_9R_{10})_{u2}$—Ar—$(CR_9R_{10})_{u3}$;

t1 is an integer of from 1 to 20;

t2 and t3 is independently an integer of from 0 to 20;

u1 is an integer from 1 to 30;

u2 and u3 is independently an integer from 0 to 30;

each $R_7$ and each $R_8$ is independently hydrogen, alkyl, or alkoxyl;

each $R_9$ and each $R_{10}$ is independently hydrogen, alkyl, or alkoxyl;

Ar is a substituted or unsubstituted aromatic moiety;

p is an integer from 1 to 5;

q is an integer from 1 to 12;

$A^\ominus$ is selected from the group consisting of $Cl^-$, $Br^-$, $I^-$, $HSO_4^-$, $HSO_3^-$, $CH_3SO_3^-$, $NO_3^-$, $HCOO^-$, $CH_3COO^-$, $H_2PO_4^-$, $SCN^-$, $BF_4^-$, $ClO_4^-$, $SSO_3^-$, $PF_6^-$, and $SbCl_6^-$; and J is alkyl, arylalkyl, or alkylaryl. In one embodiment, J is methyl.

In certain embodiments, $G_1$ is $-X_1C(O)OR_1$.

In certain embodiments, $R_{11}$ and $R_{12}$ is independently methyl or ethyl.

In embodiments, resinous compounds of the disclosures are low molecular weight oligomeric dispersants having molecular weight of from about 700 to about 1500 Daltons, or from about 900 to about 1200 Daltons. In embodiments, resinous compounds of the disclosures have melting points of from about 50° C. to about 150° C., from about 70° C. to about 120° C., or from about 90° C. to about 115° C., can be incorporated into inks, such as solid inkjet inks.

It is understood that other embodiments may be utilized and structural and operational changes may be made without departure from the scope of the embodiments disclosed herein.

BRIEF DESCRIPTION OF THE DRAWINGS

For a better understanding of the present embodiments, reference may be had to the accompanying figures.

DETAILED DESCRIPTION

Definition

The term "alkylene," refers to a straight or branched chain, hydrocarbon group. The alkylene group may be optionally substituted, for example with a hydrocarbyl substituent or with a heterohydrocarbyl substituent. The term "hydrocarbyl," refers to a substituent having only one or more carbon atoms and one or more hydrogen atoms and the term "heterohydrocarbyl," refers to a substituent having one or more carbon atoms, one or more hydrogen atoms, and one or more hetero-atoms (i.e. one or more atoms that are neither carbon nor hydrogen). The term "aromatic alkylene," refers to a straight or branched chain hydrocarbon group containing an aromatic moiety. The substituents of an "optionally substituted" group may include, without limitation, one or more substituents independently selected from the following groups or a particular designated set of groups, alone or in combination: lower alkyl, lower alkenyl, lower alkynyl, lower alkanoyl, lower heteroalkyl, lower heterocycloalkyl, lower haloalkyl, lower haloalkenyl, lower haloalkynyl, lower perhaloalkyl, lower perhaloalkoxy, lower cycloalkyl, phenyl, aryl, aryloxy, lower alkoxy, lower haloalkoxy, oxo, lower acyloxy, carbonyl, carboxyl, lower alkylcarbonyl, lower carboxyester, lower carboxamido, cyano, hydrogen, halogen, hydroxy, amino, lower alkylamino, arylamino, amido, nitro, thiol, lower alkylthio, arylthio, lower alkylsulfinyl, lower alkylsulfonyl, arylsulfinyl, arylsulfonyl, arylthio, sulfonate, sulfonic acid, trisubstituted silyl, $N_3$, SH, $SCH_3$, $C(O)CH_3$, $CO_2CH_3$, $CO_2H$, pyridinyl, thiophene, furanyl, lower carbamate, and lower urea.

The term "aliphatic," describes a chemical moiety which is not aromatic and does not comprise an aromatic component. An aliphatic chain can be linear, branched, cyclic, saturated or partially unsaturated hydrocarbyl groups, including alkylene groups, for example, polymethylene groups such as $-(CH_2)_n-$, wherein n is an integer from 1 to about 100, and cycloalkylene groups. The alkylene group can be substituted or unsubstituted. Suitable alkylene substituents include hydroxyl groups and halogen atoms, for example, fluorine, chlorine and bromine atoms. The alkylene group can also, optionally, be interrupted at one or more points by a heteroatom, such as an oxygen, nitrogen or sulfur atom. The aliphatic spacer group can also be a partially unsaturated group, such as a substituted or unsubstituted $C_2$-$C_{100}$ alkenylene group or a $C_2$-$C_{100}$ alkenylene group interrupted at one or more points by a heteroatom.

The term "alkyl," refers to a straight chain or branched chain alkyl radical. Alkyl groups may be optionally substituted as defined herein. The term "lower alkyl," refers to a straight chain or branched alkyl group having 1 to 8 carbon atoms, or having 1 to 6 carbon atoms, or having 1 to 3 carbon atoms.

The term "arylalkyl," refers to an aryl group attached to the parent molecular moiety through an alkyl group.

The term "alkylaryl," refers to an alkyl group attached to the parent molecular moiety through an aryl group.

The term "aromatic" as used herein alone or as part of another group denote optionally substituted homo- or heterocyclic aromatic groups. These aromatic groups may be monocyclic or bicyclic groups containing from 5 to 12 atoms in the ring portion. The term "aromatic" encompasses the "aryl" and "heteroaryl" groups defined below.

The terms "aryl" as used herein alone or as part of another group denote optionally substituted homocyclic aromatic groups, preferably monocyclic or bicyclic groups containing from 5 to 12 carbons in the ring portion, such as phenyl, biphenyl, naphthyl, substituted phenyl, substituted biphenyl or substituted naphthyl.

Preparation of Certain Embodiments

General Synthetic Methods for Preparing Compounds

Molecular embodiments of the present embodiments can be synthesized using standard synthetic techniques known to those of skill in the art. Resinous compounds of the present embodiments can be synthesized using the general synthetic procedures set forth in Schemes I-VI.

Scheme I:

Resinous compounds of the present disclosure can be prepared by any desired or effective procedures. In embodiments, resinous compounds can be prepared according to Scheme I, by first reacting an aliphatic long chain alcohol (R₁—OH) or (R₁'—OH) 2 or 2' with a dicarboxylic acid (HOC(O)X₁C(O)OH) or (HOC(O)X₁C(O)OH) 1 or 1' to form an ester-acid intermediate 3 or 3', and subsequently reacting the ester-acid intermediate 3 or 3' with a diamine (H₂N—[(CR₅R₆)ₚ—NR₃]_q—H) 4, wherein R₁ or R₁' is independently an alkyl group with from about 10 to about 80 carbon atoms, from about 20 to about 60 carbon atoms, from about 30 to 50 carbon atoms; each R₅ and each R₆ are independently hydrogen or alkyl such as a lower alkyl or hydrogen; p represents the number of alkylene repeat units and can be from 1 to 5, or 2 to 3; and q represents the number of alkylene amine repeat units, and can be from 1 to 10 from 1 to 8 or 1 to 4; each R₃ is independently hydrogen, alkyl, arylalkyl or alkylaryl; in one embodiment, each R₃ can be hydrogen, and in one embodiment, the R₃ attached to the terminal nitrogen is not hydrogen, and can be alkyl, such as methyl; in certain embodiments, X₁ or X₁', is independently a straight or branched alkylene group; in one embodiment, X₁ is a straight or branched alkylene group having the formula (CR₇R₈)_t1; in certain embodiments, X₁ or X₁, is independently a straight or branched aromatic alkylene group having the formula (CR₇R₈)_t2—Ar—(CR₇R₈)_t3; wherein t1 is an integer of from 1 to 20, an integer from 3 to 15, or an integer from 5 to 10, t2 and t3 is independently an integer of from 0 to 20, an integer from 0 to 10, or an integer from 1 to 5, each R₇ and each R₈ is independently hydrogen, alkyl, or alkoxyl, and wherein Ar is a substituted or unsubstituted aromatic moiety including benzyl, phenyl, naphthyl and biphenyl and the like. In one embodiment, at least one of the each R₇ and each R₈ is lower alkyl, or each R₇ and each R₈ are hydrogen.

The long chain alcohols 2 or 2' useful in the present embodiments have at least 10 carbon atoms in a saturated or unsaturated linear, or saturated or unsaturated branched chain and include tetradecanol, undecanol, stearyl alcohol, 2-decanol, decanol, 2-dodecanol, tridecanol, hexadecanol, 2-undecanol, 2-tetradecanol, heptadecanol, oleyl alcohol, linoleyl alcohol, linolenyl alcohol, cetyl alcohol, myristyl alcohol, lauric alcohol, hexadecylic alcohol, isostearyl alcohol, octyldodecanol, capryl alcohol, henicosan-1-ol, docosan-1-ol, tricosan-1-ol, tetracosan-1-ol, pentacosan-1-ol, hexacosan-1-ol, heptaxosan-1-ol, octacosan-1-ol, nonacosan-1-ol, triacontan-1-ol, hentriacontan-1-ol, dotriacontan-1-ol, tritriacontan-1-ol, tetratriacontan-1-ol, hexatriacontan-1-ol, heptatriacontan-1-ol, octatriacontan-1-ol, nonatriacontan-1-ol, tetracontan-1-ol, hentetracontan-1-ol, dotetracontan-1-ol, tritetracontan-1-ol, tetratetracontan-1-ol, pentatetracontan-1-ol, hexatetracontan-1-ol, heptatetracontan-1-ol, octatetracontan-1-ol, 2-hexyl-1-decanol, 2-octyl-1-dodecanol. UNILIN 700 alcohol having 48 carbon atoms can be used in the present embodiments.

Any suitable dicarboxylic acid can be used in preparing ester-acid intermediate such as include, oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid, suberic acid (octanedioic acid), azelaic acid (nonanedioic acid), sebacic acid (decanedioic acid), undecanedioic acid, dodecanedioic acid, brassylic acid (tridecanedioic acid), tetradecanedioic acid, pentadecanedioic acid, thapsic acid (dexadecanedioic acid), octadecanedioic acid. Non-limiting examples of dicarboxylic acids having at least one carbon-carbon double bond include itaconic acid, maleic acid, fumaric acid, mesaconic acid, and citraconic acid. Non-limiting examples of suitable aromatic diacids in preparing ester-acid intermediate include terephthalic acid, naphthalene dicarboxylic acids, such as 2,6-naphthalene dicarboxylic acid, thianthrene diacids, 4,4'-biphenyldicarboxylic acid and the like.

In certain embodiments, ester-acid intermediate 3 is prepared by reacting more than 1 molar equivalent of an aliphatic long chain alcohol 2 with a dicarboxylic acid 1 being equivalent. In certain embodiments, the ester-acid intermediate 2 is prepared by reacting from at least 1 to about 5 molar equivalents of an aliphatic long chain alcohol 2 with a dicarboxylic acid 1 being equivalent.

In certain embodiments, diamine 4 may be polyalkylenepolyamines which contains up to approximately 10 alkylene units, or from 1 to 6 alkylene units, from 2 to 4 alkylene units, or from 2 to 4 alkylene units. Polyethylenepolyamines are those of the ethylenediamine series containing from 2 to about 10 ethylene units. Polyethylenepolyamines examples include diethylenetriamine, triethylenetetramine, tetraethylenepentamine (TEPA), heptaethyleneoctamine, nonaethylenedecamine, pentaethylenehexamine, ethylenimine E-100, and the like. Polypropylenepolyamines are those of the propylenediamine series containing from 2 to 10 propylene units. In other embodiments, diamine 4 may be alkylated diamines such as 1,6-hexyl diamine 1,8-octyl diamine, 1,10-decyl diamine, 1,12-dodecyldiamine, bis-(4-aminocyclohexyl)-methane, 1,2-diaminocyclohexane, cis-1,5-diaminocyclooctane. In still other embodiments, diamine 4 may be aromatic diamines such as 1,2-diaminobenzene, 1,3-diaminobenzene, 1,4-diaminobenzene, naphthalene-1,4-diamine, naphthalene-1,5-diamine, naphthalene-1,8-diamine, naphthalene-2,3-diamine, p-xylylenediamine, [1,1'-biphenyl]-4,4'-diamine, bis-(4-aminophenyl)-methane, Diamine 4, in other embodiments may be polyetherdiamines such as 4,7,10-trioxatridecane-1,13-diamine, Dynamar™ Polyetherdiamine HC1101 from 3M Company, JEFFAMINE D Series of diamine-terminated polypropylene glycols from Huntsman Corporation.

In certain embodiments, said reaction between an aliphatic long chain alcohol with a dicarboxylic acid is carried out in a high boiling point solvent having a boiling point of from about 80° C. to about 200° C., or a boiling point of from about 100° C. to about 130° C. Non-limiting examples of high boiling point solvents suitable for the reaction are water, toluene, xylene, benzene, chlorobenzene, dichlorobenzene, dimethyl sulfoxide (DMSO), N-methyl-pyrrolidone (NMP), N,N-dimethylformamide (DMF), dimethyl acetamide (DMA or DMAc) and mixtures thereof. Suitable aliphatic co-solvents can be selected to help dissolve the stating materials. For example, suitable co-solvents for use in combination with the high boiling point solvent include methanol, ethanol, isopropanol, chloroform, dichloromethane, 1,2-dichloroethane, acetonitrile, or a mixture thereof.

In certain embodiments, the reaction between an aliphatic long chain alcohol with a dicarboxylic acid is carried out in the present of a catalyst. Non-limiting examples of catalyst suitable for the reaction are FASCAT 4100, FASCAT 4350, FASCAT 9100.

Subsequently, ester acid intermediate 3 is reacted with diamine 4 to form resinous compounds 5 and 6. Resinous compound 5, having a long chain aliphatic tail on one end, can be prepared by reacting 1 molar equivalent of ester acid intermediate 3 with 2 molar equivalents of diamine 4 (Scheme I (a)). Resinous compound 6, having the same long chain aliphatic tail on both ends, can be prepared by reacting 1 molar equivalent of ester acid intermediate 3 with 2 molar equivalents of diamine 4 (Scheme I (b)). Resinous compound 7, having different long chain aliphatic tail on each end, can be prepared by reacting 1 molar equivalent of resinous compound 6 with 1 molar equivalent of a different ester-acid intermediate 3' (Scheme I (c)).

Scheme II:

12

↓ R₂COOH

10

13

In embodiments, resinous compounds can be prepared according to Scheme II, by first reacting an acid-alcohol (HOX₂C(O)OH) 8 with diamine (H₂N—[(CR₅R₆)$_p$—NR₃]$_q$—H) 4 to form an amide-alcohol intermediate 9 or 12, in which R₃, R₅, R₆, p and q are as defined above; in certain embodiments, X₂ is a straight or branched alkylene group having the formula (CR₉R₁₀)$_{u1}$; in certain embodiments, X₂ is a straight or branched aromatic alkylene group having the formula (CR₉R₁₀)$_{u2}$—Ar—(CR₉R₁₀)$_{u3}$, wherein u1 is an integer from 1 to 30, an integer from 5 to 20, or an integer from 8 to 16, u2 and u3 is independently an integer from 0 to 30, an integer from 0 to 10, or an integer from 1 to 5; wherein each R₉ and each R₁₀ may independently be hydrogen, alkyl, or alkoxyl, and wherein Ar is a substituted or unsubstituted aromatic moiety including benzyl, phenyl, naphthyl and biphenyl and the like. In one embodiment, at least one of the each R₉ and each R₁₀ is lower alkyl or hydrogen. Any suitable acid-alcohol 8 can be used in preparing amide-alcohol intermediate 9 or 12. Particularly, acid-alcohol 8 suitable for use in the present embodiments includes ω-hydroxy acids. ω-hydroxy acids are a class of naturally-occurring straight-chain aliphatic organic acids n carbon atoms long with a carboxyl group at position 1 and a hydroxyl at position n. Non-limiting example of acid-alcohol 8 includes 2-hydroxyacetic acid, 3-hydroxypropanoic acid, 4-hydroxybutanoic acid, 5-hydroxypentanoic acid, 6-hydroxyhexanoic acid, 7-hydroxyheptanoic acid, 8-hydroxyoctanoic acid, 9-hydroxynonanoic acid, 10-hydroxydecanoic acid, 11-hydroxyundecanoic acid, 12-hydroxydodecanoic acid, 13-hydroxytridecanoic acid, 14-hydroxytetradecanoic acid, 15-hydroxypentadecanoic acid, 16-hydroxyhexadecanoic acid, 17-hydroxyheptadecanoic acid, 18-hydroxyoctadecanoic acid. Non-limiting suitable examples of aromatic hydroxyl carboxylic acids include 2-hydroxybenzoic acid, 3-hydroxybenzoic acid, 4-hydroxybenzoic acid, 2-hydroxy-5-methylbenzoic acid, (3-hydroxyphenyl)acetic acid, 2-hydroxy-6-napthoic acid, 4'-hydroxybiphenyl-4-carboxylic acid.

Amide-alcohol intermediate 9, having an alcohol terminal group and an amino terminal group on each end, can be prepared by reacting 1 molar equivalent of acid-alcohol 8 with 1 molar equivalent of diamine 4 (Scheme II (a)). Amide-alcohol intermediate 12, having alcohol terminal groups on both ends, can be prepared by reacting 2 molar equivalents of acid-alcohol 8 with 1 molar equivalent of diamine 4 (Scheme II (b)).

Resinous compounds 11 and 13 can be prepared by subsequently reacting amide-alcohol intermediate 9 or 12 with long chain monocarboxylic acid (R₂COOH) 10, wherein R₂ is an alkyl group with from about 2 to about 40 carbon atoms, from about 4 to about 20 carbon atoms, from about 6 to 10 carbon atoms resinous compound 11 can be prepared by reacting 1 molar equivalent of amide-alcohol intermediate 9 with 1 molar equivalent of long chain monocarboxylic acid (R₂COOH) 10. Resinous compound 13 can be prepared by reacting 1 molar equivalent of amide-alcohol intermediate 12 with 1 molar equivalent of long chain monocarboxylic acid (R₂COOH) 10.

Scheme III:

-continued

16

Resinous compound salt 16 can be prepared by first reacting ester-acid intermediate 3 with a functionalized diamine ($H_2N$—[$(CR_6R_6)_p$—$NR_3]_{q-1}$—$(CR_5R_6)_p$—$NR_{11}R_{12}$) 14 to form resinous compound 15, and subsequently treating resinous compound 15 with a salting agent (JA), in which $R_1$, $R_3$, $R_5$, $R_6$, p and q are as defined above, $R_{11}$ and $R_{12}$ are independently, alkyl, arylalkyl or alkylaryl, in one embodiment, both $R_{11}$ and $R_{12}$ are lower alkyl such as methyl. Non-limiting examples of salting agent suitable for the reaction include dimethyl sulfate. $A^\ominus$ is an anion, with examples of suitable anions including, but are not limited to $Cl^-$, $Br^-$, $I^-$, $HSO_4^-$, $HSO_3^-$, $CH_3SO_3^-$, $NO_3^-$, $HCOO^-$, $CH_3COO^-$, $H_2PO_4^-$, $SCN^-$, $BF_4^-$, $ClO_4^-$, $SSO_3^-$, $PF_6^-$, $SbCl_6^-$, or the like. J is alkyl, arylalkyl or alkylaryl. In certain embodiments, J is a lower alkyl, for example a methyl or an ethyl group.

Diamine 14 are similar to diamine 4 except that diamine 14 contains a terminal tertiary amine on one side of the molecule. Diamine 14 may be polyalkylenepolyamines which contains up to approximately 10 alkylene units, or from 1 to 6 alkylene units, from 2 to 4 alkylene units, or from 2 to 4 alkylene units. Polyethylenepolyamines are those of the ethylenediamine series containing from 2 to about 10 ethylene units. Polypropylenepolyamines example include N-methyl-1,3-propane diamine, and the like. Specific examples of polypropylenepolyamines include Ethylenimine E-100 from Huntsman and Polyethyleneimine Mw=25,000 and Mw=800 from Aldrich.

In one embodiment, resinous compound 15 can be treated with dimethyl sulfate to form resinous compound 16'. $R_1$, $R_3$, $R_5$, $R_6$, $R_{11}$ and $R_{12}$, p and q are as defined above.

Scheme V:

Scheme IV:

-continued

19

Resinous compound salt 19 can be prepared by first reacting acid-alcohol intermediate 8 with a functionalized diamine ($H_2N$—$[(CR_5R_6)_p$—$NR_{11}]_q$—$R_{12}$) 14 to form amide-alcohol intermediate 17, and subsequently reacting amide-alcohol intermediate 17 with long chain monocarboxylic acid 10 to form resinous compound 18, and finally treating resinous compound 18 with a salting agent. $R_1$, $R_3$, $R_5$, $R_6$, $R_{11}$ and $R_{12}$, p, q, $A^\ominus$ and J are as defined above.

Scheme VI:

In one embodiment, Rresinous compound 18 can be treated with dimethyl sulfate to form resinous compound 19'. $R_1$, $R_3$, $R_5$, $R_6$, $R_{11}$ and $R_{12}$, p and q are as defined above.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

General Methods

The infrared (IR) spectrum of a compound sample was performed in a diamond cell in a transmittance mode in the FTIR Microscope:
 Spectro-Tech Micro Sample Plan with Diamond Window, P.N. 0042-444
 NicPlan IR Microscope with MCT/A detector, 100 scans @4 cm$^{-1}$ Reflectachromat™ 15× objective.

Data from Differential Scanning calorimetry (DSC) technique was obtained from a Q-1000 instrument available from TA Instruments such that each of the samples were heated and cooled from −20 to 200° C. at a heating and cooling rate of 10° C. per minute. Heat of crystallization data was obtained from the first cooling cycle and heat of fusion data was obtained from the second heating cycle.

Various resinous compounds were prepared according to the methods described above.

Example 1

General Methods for Preparing Compounds According to Scheme I

Esterification (preparation of ester-acid intermediate). In a 1 L resin kettle fitted with mechanical stirring, heating mantle, temperature controller, Argon inlet, Dean-Stark trap and reflux condenser were introduced UNILIN 700 resin from Baker Petrolite in slight excess, toluene solvent, catalyst and the corresponding amount of sebacic acid. Under a stream of Argon, the temperature in the kettle was raised to 100° C. and the UNILIN 700 resin was allowed to melt. When the reaction mixture was homogenous (UNILIN 700 has completely melted), the temperature was gradually raised to 120° C. with stirring, and the reaction was allowed to proceed for 26 to 30 hours depending on titration results. Water was collected into the Dean-Stark trap. When the acid number remained constant, the temperature was raised to 140° C. and toluene was distilled off. At the end of the distillation, the reaction was stopped, and the kettle was emptied.

Amide Bond Formation—Using the same setup as described in step 1 of this Example, in the kettle were introduced the ester-acid intermediate (or precursor) and the corresponding amount of diamine. Under a stream of Argon, the temperature in the kettle was raised to 100° C. and the mixture of compounds was allowed to melt. When the reaction mixture became homogenous, the temperature was gradually raised to 180° C. with stirring, and the reaction was allowed to proceed for 5 hours as indicated by titration results. Water was collected into the Dean-Stark trap. The kettle was allowed to cool and the product was discharged in an aluminum tray.

Example 2

Preparation of Compound No. 1, Octatetracontyl 9-(2-(2-(2-(2-aminoethylamino)ethylamino)ethylamino)ethylcarbamoyl)nonanoate (using reagents: UNILIN 700: Sebacic Acid: TEPA (1:1:1))

Step 1 (Esterification—ester-acid intermediate, 9-((octatetracontyloxy)carbonyl)nonanoic acid)

In a 1 L resin kettle fitted with mechanical stirring, heating mantle, temperature controller, Argon inlet, Dean-Stark trap and reflux condenser were introduced 375.6 g of UNILIN 700 resin from Baker Petrolite and 100 g sebacic acid (Aldrich), and 0.1 g FASCAT 4100. Under a stream of Argon, the temperature in the kettle was raised to 100° C. and the components were allowed to melt. When the reaction mixture became homogenous, the temperature was raised to 180° C. with stirring, and the reaction was allowed to proceed for 26 hours. Water (3 mL) was collected into the Dean-Stark trap. The reaction was stopped, cooled down to 100° C. and the beige resinous product (210 g, 50%) was discharged in an aluminum tray. Acid number determined for the intermediate compound was 65.02.

Step 2 (Amide bond formation—Compound No. 1, Octatetracontyl 9-(2-(2-(2-(2-aminoethylamino)ethylamino)ethylamino)ethylcarbamoyl)nonanoate, MW=1046)

Using the same setup as described in step 1 of this Example, in the kettle were introduced 103.54 g of ester-acid intermediate and 22.68 g of TEPA. Under a stream of Argon, the temperature in the kettle was raised to 100° C. and the mixture of compounds was allowed to melt. When the reaction mixture became homogenous, the temperature was gradually raised to 180° C. with stirring, and the reaction was allowed to proceed for 5 hours as indicated by titration results. Water (2 mL) was collected into the Dean-Stark trap. The kettle was allowed to cool and the kettle content containing of a mixture of product and elastomer (settled at the bottom) was discharged in a container. After decanting the product (top), 66 g (54%) of the tri-component resin were obtained.

Example 3

Preparation of Compound No. 2, Octatetracontyl 9-(3-(methylamino)propylcarbamoyl)nonanoate (using reagents: UNILIN 700: Sebacic Acid: N-methyl-1,3-propane diamine (1:1:1))

Step 1 (Esterification—ester-acid intermediate, 9-((octatetracontyloxy)carbonyl)nonanoic acid)

The ester-acid was prepared according to the procedures described in step 1 of Example 2.

Step 2 (Amide bond formation—Compound No. 2, Octatetracontyl 9-(3-(methylamino)propylcarbamoyl)nonanoate, MW=945)

Using the same setup as for esterification, in the kettle were introduced 103.54 g of the ester-acid intermediate and 10.58 g of N-methyl-1,3-propane diamine. Under a stream of Argon, the temperature in the kettle was raised to 100° C. and the mixture of compounds was allowed to melt. When the reaction mixture became homogenous, the temperature was gradually raised to 180° C. with stirring, and the reaction was allowed to proceed for 5 hours as indicated by titration results. Water (2 mL) was collected into the Dean-Stark trap. The kettle was allowed to cool and the kettle content containing of a mixture of product and elastomer (settled at the bottom) was discharged in a container. After decanting the product (top), 80 g (71%) of the tri-component resin were obtained.

Example 4

Preparation of Compound No. 3, Octatetracontyl 9-(2-aminoethylcarbamoyl)nonanoate (using reagents: UNILIN 700: Sebacic Acid: Ethylenimine E-100 (1:1:1))

Step 1 (Esterification—ester-acid intermediate, 9-((octatetracontyloxy)carbonyl)nonanoic acid)

In a 1 L resin kettle fitted with mechanical stirring, heating mantle, temperature controller, Argon inlet, Dean-Stark trap and reflux condenser were introduced UNILIN 700 resin (353.3 g) from Baker Petrolite and sebacic acid (94 g), toluene (500 mL) and FASCAT 4100 (1.1 g). Under a stream of Argon, the temperature in the kettle was raised to 100° C. and the components were allowed to melt. When the reaction mixture became homogenous, the temperature was raised to 120° C. with stirring, and the reaction was allowed to proceed for 26 hours. Water (3 mL) was collected into the Dean-Stark trap. The temperature in the kettle was raised to 130° C. to distill off the Toluene. At the end of the distillation, the reaction was stopped, cooled down to 100° C. and the beige resinous product (310 g, 76%) was discharged in an aluminum tray. Acid number determined for the intermediate compound was 65.02.

Step 2 (Amide bond formation—Compound No. 3)

Using the same setup as described in step 1 of this Example, in the kettle were introduced 118.54 g of the precursor and ethylenimine E-100 (31.8 g). Under a stream of Argon, the temperature in the kettle was raised to 100° C. and the mixture of compounds was allowed to melt. When the reaction mixture became homogenous, the temperature was gradually raised to 180° C. with stirring, and the reaction was allowed to proceed for 5 hours as indicated by titration results. Water (1.5 mL) was collected into the Dean-Stark trap. The kettle was allowed to cool and the kettle content containing of a mixture of product and elastomer (settled at the bottom) was discharged in a container. After decanting the product (top), 70 g (47%) of the tri-component resin were obtained.

Example 5

General Methods for Preparing Compounds According to Scheme III or IV

Preparation of Compound No. 4 (using reagents: UNILIN 700: Sebacic acid: N,N-dimethyl-1,3-propane diamine (1:1:1))

In a 1000 mL resin kettle fitted with mechanical stirring, heating mantle, temperature contoller, Argon inlet, Dean-Stark trap and reflux condenser were introduced 8.89 g of N,N dimethyl propanediamine and 95.7 g of Unilin 700 Sebacic acid ester. Under a stream of Argon, the temperature in the kettle was raised to 100° C. and the mixture of compounds was allowed to melt. When the reaction mixture became homogenous, the temperature was gradually raised to 180° C. with stirring, and the reaction was allowed to proceed for 5 hours as indicated by titration results. Water was collected into the Dean-Stark trap. When the reaction was judged as complete by titration, the temperature was lowered to 120° C. and 5 mL of dimethyl sulfate were added to the reaction mixture via a dropping funnel. At the end of the addition, the reaction was allowed to proceed at this temperature for an hour. Finally, the temperature of the mixture is raised to 180° C. and the product is discharged hot from the resin kettle. Product was obtained as a beige solid (98 g).

Example 6

General Methods for Preparing Compounds According to Scheme II

In a 150 mL resin kettle fitted with mechanical stirring, heating mantle, temperature contoller, Argon inlet, Dean-Stark trap and reflux condenser were introduced the diamine and the acid alcohol derivative. Under a stream of Argon, the temperature in the kettle was raised to 100° C. and the mixture of compounds was allowed to melt. When the reaction mixture became homogenous, the temperature was gradually raised to 180° C. with stirring, and the reaction was allowed to proceed for 5 hours as indicated by titration results. Water was collected into the Dean-Stark trap. When the reaction was judged as complete by titration, the same procedure is repeated for the second acid. When titration indicates that the reaction is complete, the reaction is stopped and the product is discharged in an aluminum tray.

Example 7

Preparation of Compound No. 5 (using reagents: 12-Hydroxydodecanoic Acid:TEPA:Unicid 700 (1:1:1))

In a 150 mL resin kettle fitted with mechanical stirring, heating mantle, temperature controller, Argon inlet, Dean-Stark trap and reflux condenser were introduced TEPA (12.29 g) and 12-hydroxydodecanoic acid (14.9 g). Under a stream of Argon, the temperature in the kettle was raised to 100° C. and the mixture of compounds was allowed to melt. When the reaction mixture became homogenous, the temperature was gradually raised to 180° C. with stirring, and the reaction was allowed to proceed for 5 hours as indicated by titration results. Water (0.7 mL) was collected into the Dean-Stark trap. The acid number of the intermediate was 2.47 and the reaction was judged as complete and stopped. The same procedure is repeated for Unicid 700 (43 g). The acid number indicated by titration for the final product was 5.29, and the reaction was judged complete and stopped. The product (60.49 g, 81%) was discharged in an aluminum tray. MW of Compound No. 5 is 1088.

TABLE 1

Examples of resinous compounds prepared according to Scheme I.

| No | Alcohol | Dicarboxylic acid | Diamine | Resinous compound structure |
|---|---|---|---|---|
| 1 | UNILIN 700 | Sebacic Acid | Tetra-ethylene penta-amine (TEPA) | |
| 2 | UNILIN 700 | Sebacic Acid | N-methyl-1,3-propane diamine | |
| 3 | UNILIN 700 | Sebacic Acid | Ethyl-enimine E-100 | n = 1 to 30 |

TABLE 2

Examples of pigment resinous compounds prepared according to Scheme III or IV.

| No | Alcohol | Dicarboxylic acid | Diamine | Resinous compound structure |
|---|---|---|---|---|
| 4 | UNILIN 700 | Sebacic Acid | N,N-dimethyl-1,3-propane diamine | |

TABLE 3

Examples of resinous compounds prepared according to Scheme II.

| | Reagents used according to Scheme II | | | |
|---|---|---|---|---|
| No | Acid alcohol derivative | Acid | Diamine | Resinous compound structure |
| 5 | 12-hydroxy-dodecanoic acid | Unicid 700 | Tetraethylene pentaamine (TEPA) | (structure shown) |

The resinous compounds were characterized through differential scanning calorimetry (DSC), infrared spectroscopy (IR), and titration to determine acid number and amine number. It was convenient to assess the various reactions' progresses by determining the acid and amine values or numbers of the products as they were being formed. For acid value determination, a known quantity of the product was mixed in a heated solution of n-butanol, toluene and isopropyl alcohol with a few drops of phenolphthalein indicator solution added which was then titrated with a methanolic potassium hydroxide solution having known normality. The titration proceeded to an end point with the acid value being defined as the number of milligrams of potassium hydroxide needed to neutralize one gram of sample. Acid value=(A×N×56.1)/W where A is the volume of titrant in milliliters consumed in the titration, N is the normality of the postassium hydroxide solution and W is the weight of the sample being titrated. For amine value determination, a known quantity of the product was mixed in a heated solution of n-butanol, toluene and isopropyl alcohol with a few drops of phenolphthalein indicator solution added which was then titrated with a methanolic hydrochloric acid solution having known normality. The titration proceeded to an end point with the amine value being defined as the number of milligrams of hydrochloric acid needed to neutralize one gram of sample. Amine value=(A× N×36.5)/W where A is the volume of titrant in milliliters consumed in the titration, N is the normality of the hydrochloric acid solution and W is the weight of the sample being titrated.

Samples of the reactions were drawn hourly to assess completion by measuring those samples' acid and amine numbers. In the case of esters formation, the acid number remained constant even after several hours of heating at 120° C., the reaction was judged as complete. In the case of amide bond formation, the acid and amine numbers remained constant after 5 hours of heating at 180° C. The characterization results for DSC and titration of the final products are set forth in Table 2.

TABLE 4

Characterization of prepared resinous compounds.

| No | Titration Acid # (mg KOH/g) | Titration Amine # (mg HCl/g) | Onset of Crystallization (° C.) | Peak of Crystallization (° C.) | Peak of Melting (° C.) | End of Melting (° C.) |
|---|---|---|---|---|---|---|
| 1 | Not determined | 57.6 | 99.42 | 97.21 | 93.34, 104.59 | 110.03 |
| 2 | 16.54 | 27.56 | 99.4 | 97 | 95, 103.36, 107 | 109.5 |
| 3 | 1.04 | 50.34 | 99.98 | 97.28 | 95.3, 104.1 | 108.9 |
| 4 | 6.15 | 5.44 | 96.75 | 95.47 | 103.23, 107.78 | 112.21 |
| 5 | 5.29 | 82.18 | 99.69 | 95.39 | 104.37 | 106.22 |

Figure 2:
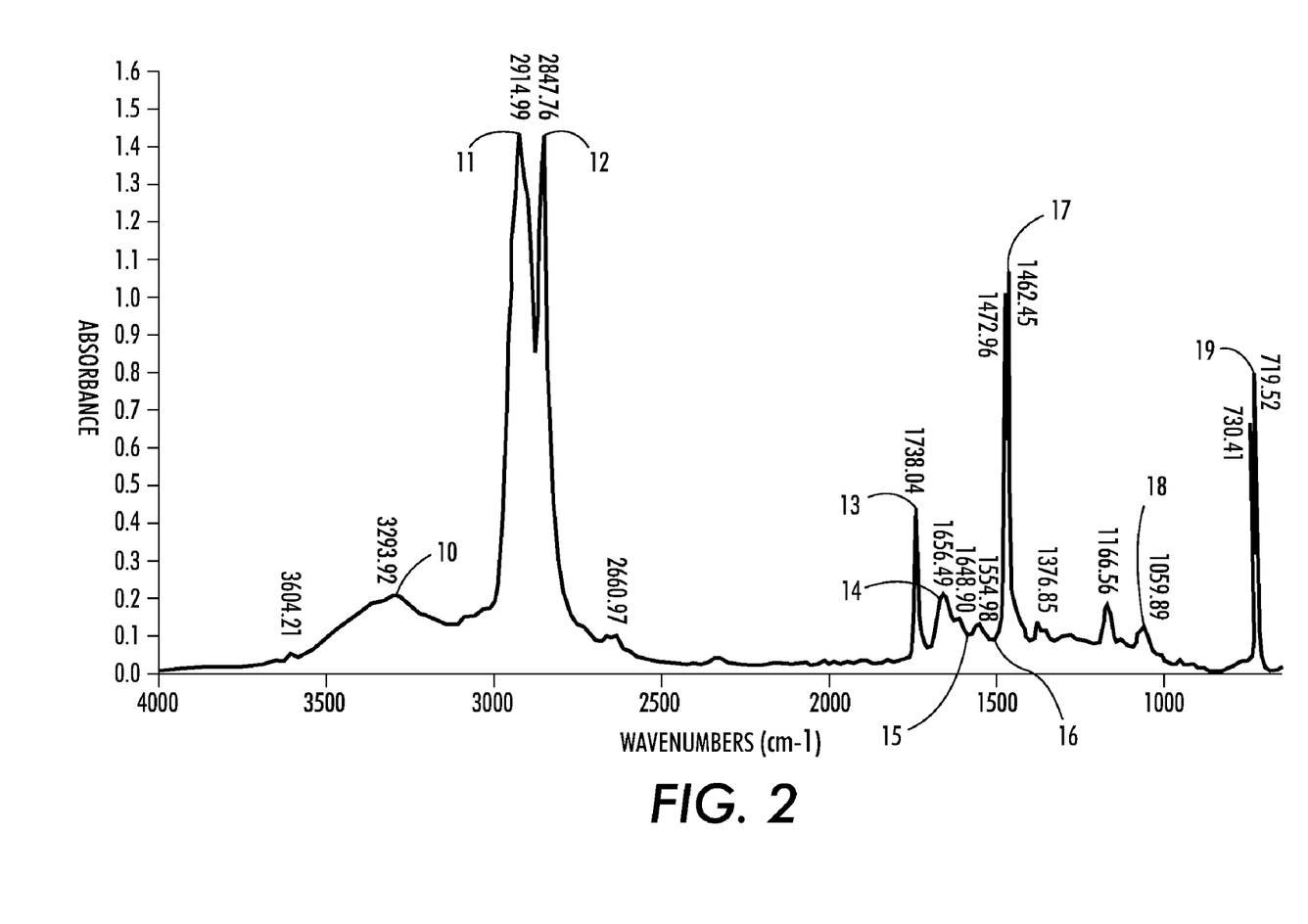
FIG. 2 illustrates the IR spectra of Compound No. 1 of Example 2.
Figure 3:
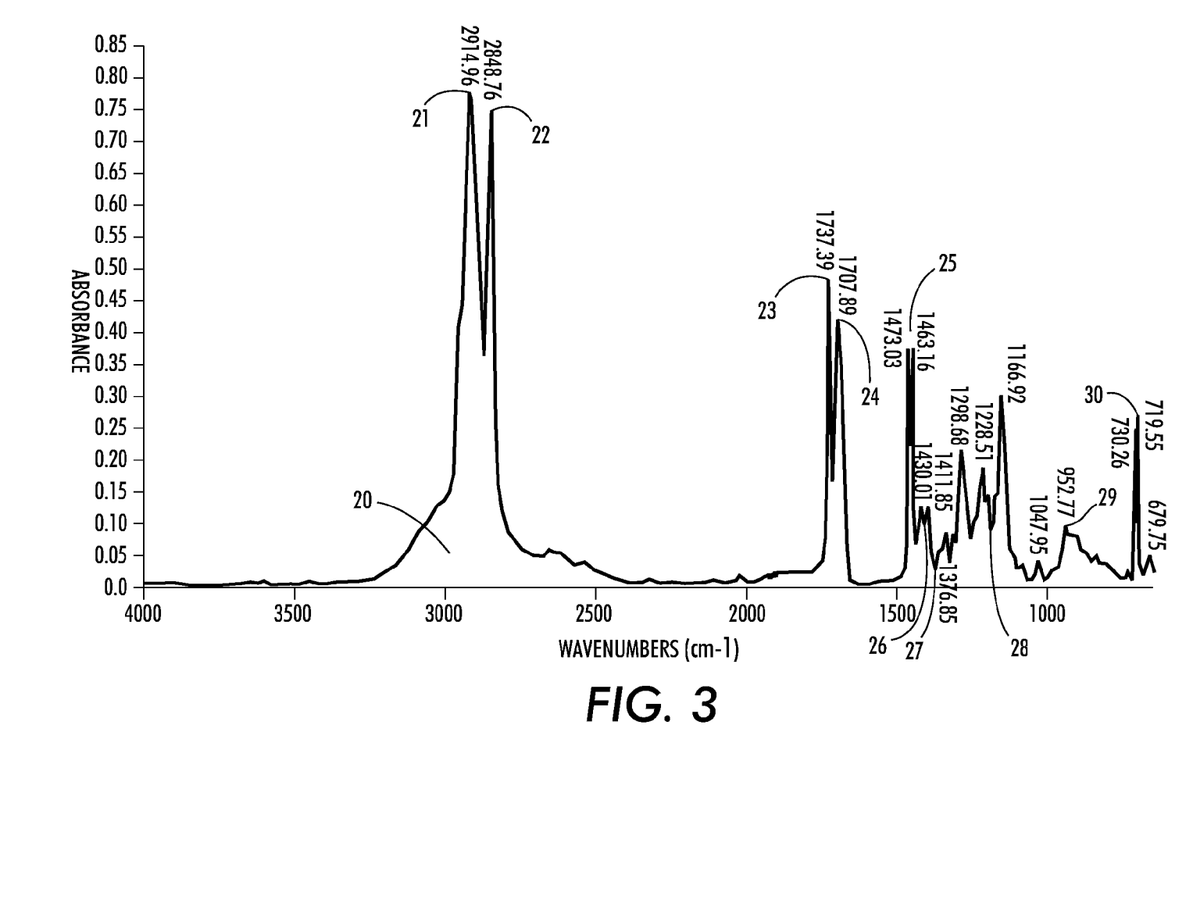
FIG. 3 illustrates the IR spectra of the ester acid intermediate, 9-((octatetracontyloxy)carbonyl)nonanoic acid, of Compound No. 1 of Example 2.
Figure 4:
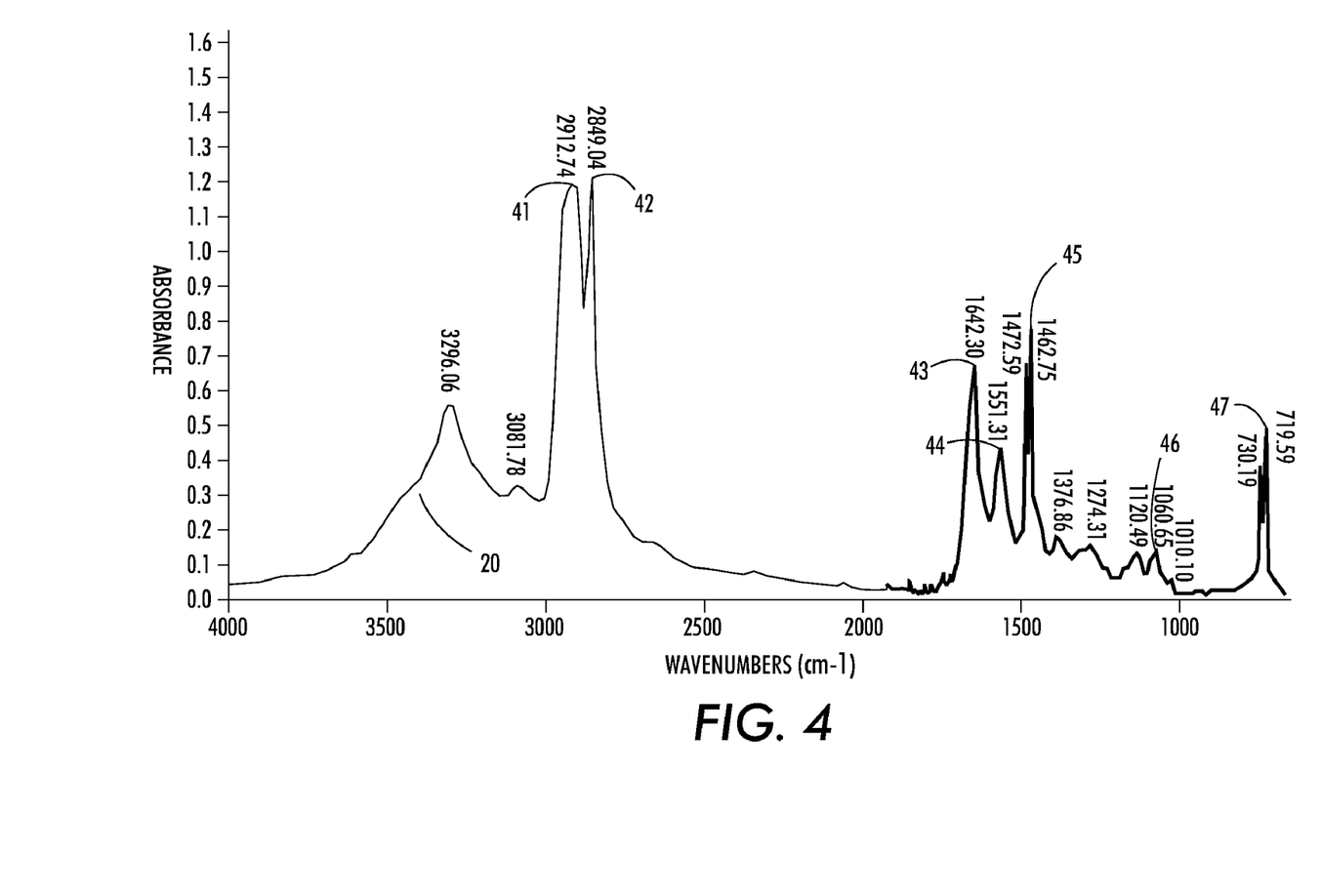
FIG. 4 illustrates the IR spectra of Compound No. 5 of Example 7.

The IR spectra of the prepared samples are illustrated in FIGS. 2-4.

FIG. 2 illustrates the IR spectra of Compound No. 1 of Example 2. Region 10 indicates an N—H stretching band of a secondary amide (3370-3270 cm$^{-1}$) and a secondary amine, and an NH$_2$ stretching of a primary aliphatic amine (3450-3250 cm$^{-1}$). Peak 11 indicates an aliphatic asymmetric CH$_2$ stretch. Peak 12 indicates an aliphatic symmetric CH$_2$ stretch. Peak 13 indicates an C═O stretch of saturated aliphatic ester. Peak 14 indicates a n C═O stretching of a secondary amide (amide I band). Peak 15 indicates an N—H deformation band from primary amines (1650-1580 cm$^{-1}$). Peak 16 indicates a secondary amide (amide II band) which combines N—H bending and C—N stretching of —CO—NH— in trans form. Peak 16 also indicates a secondary amines N—H deformation. Peak 17 indicates an CH$_2$ scissor of aliphatic chains. Region 18 indicates an aliphatic ester C—O—C stretching, an C—N stretching of secondary aliphatic amines (two bands at 1190-1170 cm$^{-1}$ and 1145-1130 cm$^{-1}$), and an C—N stretching of a primary amine (1090-1020 cm$^{-1}$). Peak 19 indicates an CH$_2$ rocking.

FIG. 3 illustrates the IR spectra of the ester acid intermediate, 9-((octatetracontyloxy)carbonyl)nonanoic acid, of Compound No. 1 of Example 2. Region 20 indicates a carboxylic acid broad OH stretch (at 3300-2500 cm$^{-1}$). Peak 21 indicates an aliphatic asymmetric CH$_2$ stretch. Peak 22 indicates an aliphatic symmetric CH$_2$ stretch. Peak 23 indicates an C═O stretch of saturated aliphatic ester. Peak 24 indicates an C═O stretch of carboxylic acid. Peak 25 indicates an CH$_2$ scissor. Peaks 26 indicate possibly a combination of C—O stretching and O—H deformation of carboxylic acid (weak 1440-1395 cm$^{-1}$), or —CH$_2$—CO— deformation of carboxylic acid (1410-1405 cm$^{-1}$). Peaks 27 indicates an CH$_3$ symmetric deformation. Region 28 indicates an aliphatic ester C—O—C stretching. Region 29 indicates a broad asymmetric band due to out of place deformation of OH . . . O (or H bonding deformation) of a carboxylic acid.

The IR spectra of Compound No. 1, octatetracontyl 9-(2-(2-(2-(2-aminoethylamino)ethylamino)ethylamino)ethylcarbamoyl)nonanoate, FIG. 2, and the IR spectra of its ester-acid intermediate, 9-((octatetracontyloxy)carbonyl)nonanoic acid, FIG. 3, prove the formation of Compound No. 1. The IR spectra of the ester-acid intermediate indicates the presence of the peak at 1707 cm$^{-1}$ corresponding to the carbonyl from the carboxylic acid, and the peak at 1737 cm$^{-1}$ corresponding to the carbonyl from the ester group, whereas the IR spectra of Compound No. 1, indicates the peak corresponding to the carboxylic acid carbonyl is replaced by the peak at 1656 cm$^{-1}$ corresponding to the amide carbonyl.

FIG. 4 illustrates the IR spectra of Compound No. 5 of Example 7. Region 40 indicates an N—H stretching band of a secondary amide (3370-3270 cm$^{-1}$) and a secondary amine, and an NH$_2$ stretching of a primary aliphatic amine (3450-3250 cm$^{-1}$). Peak 41 indicates an asymmetric CH$_2$ stretch. Peak 42 indicates a symmetric CH$_2$ stretch. Peak 43 indicates an C=O stretch of a secondary amide (amide I band). Peak 44 indicates a secondary amide (amide II band) which combines N—H bending and C—N stretching of —CO—NH— in trans form. Peak 44 also indicates a secondary amines N—H deformation. Peak 45 indicates an CH$_2$ scissor of aliphatic chains. Region 46 indicates a CN stretching of a secondary amine. Peak 47 indicates an CH$_2$ rocking.

The IR spectra of Compound No. 5, FIG. 4, indicates the presence of the peak at 1656 cm$^{-1}$ corresponding to the C=O stretch (amide I) band of secondary amide, and the alkane CH$_2$ stretches around 2914 cm$^{-1}$ (asymmetric) and 2849 cm$^{-1}$ (symmetric).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A resinous compound of the formula

I or a salt thereof, wherein:
G$_1$ is —X$_1$C(O)OR$_1$, —X$_2$OC(O)R$_2$, or —X$_2$OH;
G$_2$ is R$_4$, —C(O)R$_2$, or —C(O)X$_2$OC(O)R$_2$;
R$_1$ is an alkyl having from 10 to 80 carbon atoms;
R$_2$ is an alkyl having from 2 to 40 carbon atoms;
each R$_3$ and R$_4$ is independently hydrogen, alkyl, arylalkyl or alkylaryl, wherein the R$_3$ attached to the same nitrogen atom as R$_4$ and R$_4$ can be joined together to form a ring;
each R$_5$ and each R$_6$ is independently hydrogen or alkyl;
X$_1$ is a straight or branched alkylene group having the formula (CR$_7$R$_8$)$_{t1}$ or a straight or branched aromatic alkylene group having the formula (CR$_7$R$_8$)$_{t2}$—Ar—(CR$_7$R$_8$)$_{t3}$;
X$_2$ is a straight alkylene group having the formula (CR$_9$R$_{10}$)$_{u1}$ or a straight aromatic alkylene group having the formula (CR$_9$R$_{10}$)$_{u2}$—Ar—(CR$_9$R$_{10}$)$_{u3}$;
t1 is an integer of from 1 to 20;
t2 and t3 is independently an integer of from 0 to 20;
u1 is an integer from 1 to 30;
u2 and u3 is independently an integer from 0 to 30;
each R$_7$ and each R$_8$ is independently hydrogen, alkyl, or alkoxyl;
each R$_9$ and each R$_{10}$ is hydrogen;
Ar is an unsubstituted aromatic moiety;
p is an integer from 1 to 5; and
q is an integer from 1 to 12.

2. The resinous compound of claim 1, wherein G$_1$ is —X$_1$C(O)OR$_1$.

3. The resinous compound of claim 1, wherein R$_1$ is an alkyl comprising from 30 to 50 carbon atoms.

4. The resinous compound of claim 1, wherein R$_2$ is an alkyl comprising from 4 to 20 carbon atoms.

5. The resinous compound of claim 1, wherein each R$_3$ is hydrogen.

6. The resinous compound of claim 1, wherein G$_2$ is R$_4$.

7. The resinous compound of claim 6, wherein R$_4$ is hydrogen.

8. The resinous compound of claim 6, wherein R$_4$ is alkyl.

9. The resinous compound of claim 8, wherein R$_4$ is methyl.

10. The resinous compound of claim 1, wherein each R$_5$ and each R$_6$ are hydrogen.

11. The resinous compound of claim 1, wherein p is an integer from 2 to 3.

12. The resinous compound of claim 1, wherein q is an integer from 1 to 8.

13. The resinous compound of claim 1 having the formula or a salt thereof, wherein:
R$_1$ is an alkyl having from 10 to 80 carbon atoms;
each R$_3$ and R$_4$ is independently hydrogen, alkyl, arylalkyl or alkylaryl, wherein the R$_3$ attached to the same nitrogen atom as R$_4$ and R$_4$ can be joined together to form a ring;
each R$_5$ and each R$_6$ is independently hydrogen or alkyl;
X$_1$ is a straight or branched alkylene group having the formula (CR$_7$R$_8$)$_{t1}$ or a straight or branched aromatic alkylene group having the formula (CR$_7$R$_8$)$_{t2}$—Ar—(CR$_7$R$_8$)$_{t3}$;
t1 is an integer of from 1 to 20;
t2 and t3 is independently an integer of from 0 to 20;
each R$_7$ and each R$_8$ is independently hydrogen, alkyl, or alkoxyl;

Ar is an unsubstituted aromatic moiety;
p is an integer from 1 to 5; and
q is an integer from 1 to 12.

14. The resinous compound of claim 1 having a melting point of from about 50° C. to about 150° C.

15. A resinous compound salt of the formula

II wherein:
- $G_1$ is —$X_1C(O)OR_1$, —$X_2OC(O)R_2$, or —$X_2OH$;
- $G_2$ is, $R_{12}$, —$C(O)R_2$, —$C(O)X_1C(O)OR_1$, or —$C(O)X_2OC(O)R_2$;
- $R_1$ is an alkyl having from 10 to 80 carbon atoms;
- $R_2$ is an alkyl having from 2 to 40 carbon atoms;
- each $R_3$ is independently hydrogen, alkyl, arylalkyl or alkylaryl;
- each $R_{11}$ and $R_{12}$ is independently alkyl, arylalkyl, alkylaryl, or $R_{11}$ and $R_{12}$ can be joined together to form a ring;
- each $R_5$ and each $R_6$ is independently hydrogen or lower alkyl;
- $X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;
- $X_2$ is a straight or branched alkylene group having the formula $(CR_9R_{10})_{u1}$ or a straight or branched aromatic alkylene group having the formula $(CR_9R_{10})_{u2}$—Ar—$(CR_9R_{10})_{u3}$;
- t1 is an integer of from 1 to 20;
- t2 and t3 is independently an integer of from 0 to 20;
- u1 is an integer from 1 to 30;
- u2 and u3 is independently an integer from 0 to 30;
- each $R_7$ and each $R_8$ is independently hydrogen, alkyl, or alkoxyl;
- each $R_9$ and each $R_{10}$ is hydrogen;
- Ar is an unsubstituted aromatic moiety;
- p is an integer from 1 to 5;
- q is an integer from 1 to 12;
- $A^{\ominus}$ is selected from the group consisting of $Cl^-$, $Br^-$, $I^-$, $HSO_4^-$, $HSO_3^-$, $CH_3SO_3^-$, $NO_3^-$, $HCOO^-$, $CH_3COO^-$, $H_2PO_4^-$, $SCN^-$, $BF_4^-$, $ClO_4^-$, $SSO_3^-$, $PF_6^-$, and $SbCl_6^-$; and
- J is alkyl, arylalkyl, or alkylaryl.

16. The resinous compound salt of claim 15, wherein $G_1$ is —$X_1C(O)OR_1$.

17. The resinous compound salt of claim 15, wherein $R_{11}$ and $R_{12}$ is independently methyl or ethyl.

18. The resinous compound salt of claim 15, wherein $A^{\ominus}$ is $HSO_4^-$.

19. The resinous compound salt of claim 15, wherein J is methyl.

20. A resinous compound of the formula

I or a salt thereof, wherein:
- $G_1$ is —$X_1C(O)OR_1$, —$X_2OC(O)R_2$, or —$X_2OH$;
- $G_2$ is —$C(O)X_1C(O)OR_1$;
- $R_1$ is an alkyl comprising from 30 to 50 carbon atoms;
- $R_2$ is an alkyl having from 2 to 40 carbon atoms;
- each $R_3$ and $R_4$ is independently hydrogen, alkyl, arylalkyl or alkylaryl, wherein the $R_3$ attached to the same nitrogen atom as $R_4$ and $R_4$ can be joined together to form a ring;
- each $R_5$ and each $R_6$ is independently hydrogen or alkyl;
- $X_1$ is a straight or branched alkylene group having the formula $(CR_7R_8)_{t1}$ or a straight or branched aromatic alkylene group having the formula $(CR_7R_8)_{t2}$—Ar—$(CR_7R_8)_{t3}$;
- $X_2$ is a straight alkylene group having the formula $(CR_9R_{10})_{u1}$ or a straight aromatic alkylene group having the formula $(CR_9R_{10})_{u2}$—Ar—$(CR_9R_{10})_{u3}$;
- t1 is an integer of from 1 to 20;
- t2 and t3 is independently an integer of from 0 to 20;
- u1 is an integer from 1 to 30;
- u2 and u3 is independently an integer from 0 to 30;
- each $R_7$ and each $R_8$ is independently hydrogen, alkyl, or alkoxyl;
- each $R_9$ and each $R_{10}$ is hydrogen;
- Ar is an unsubstituted aromatic moiety;
- p is an integer from 1 to 5; and
- q is an integer from 1 to 12.

* * * * *